US009464209B2

(12) United States Patent
Dudik et al.

(10) Patent No.: US 9,464,209 B2
(45) Date of Patent: Oct. 11, 2016

(54) CONTAINER COATING COMPOSITIONS

(71) Applicant: PPG Industries Ohio, Inc., Cleveland, OH (US)

(72) Inventors: John Dudik, Apollo, PA (US); Courtney Richman, Gibsonia, PA (US); Qin Li, Mason, OH (US); Youssef Moussa, Loveland, OH (US); Randy Daughenbaugh, Monroeville, PA (US); James Rowley, Freeport, PA (US); Kareem Kaleem, Loveland, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 388 days.

(21) Appl. No.: 14/058,751

(22) Filed: Oct. 21, 2013

(65) Prior Publication Data

US 2015/0110981 A1   Apr. 23, 2015

(51) Int. Cl.
*C09D 175/06* (2006.01)
*C08G 71/04* (2006.01)
*C09D 175/08* (2006.01)

(52) U.S. Cl.
CPC ............. *C09D 175/06* (2013.01); *C08G 71/04* (2013.01); *C09D 175/08* (2013.01); *Y10T 428/1352* (2015.01)

(58) Field of Classification Search
CPC .. C09D 175/06; C09D 175/08; C08G 71/04; Y10T 428/1352
See application file for complete search history.

(56) References Cited

U.S. PATENT DOCUMENTS

| 3,224,983 | A | 12/1965 | D'Alelio |
| 4,046,729 | A | 9/1977 | Scriven et al. |
| 4,808,658 | A | 2/1989 | Walz et al. |
| 5,688,891 | A | 11/1997 | Hovestadt et al. |
| 5,994,469 | A | 11/1999 | December et al. |
| 7,122,605 | B2 | 10/2006 | Ohrbom et al. |
| 7,592,047 | B2 | 9/2009 | O'Brien et al. |
| 8,142,868 | B2 | 3/2012 | O'Brien et al. |
| 2012/0171470 | A1 | 7/2012 | Cavallin et al. |
| 2012/0208967 | A1 | 8/2012 | Birukov et al. |

FOREIGN PATENT DOCUMENTS

| CN | 1088464 C | 7/2002 |
| EP | 0780455 A2 | 6/1997 |
| JP | 2012-236925 A | 12/2011 |
| WO | WO 02/051947 A | 7/2002 |
| WO | WO 2012/115146 A1 | 8/2012 |

OTHER PUBLICATIONS

Espacenet English abstract of corresponding patent CN 1185469 A.
Fernanda M. B. Coutinho et al., "Anionic Waterborne Polyurethane Dispersion, etc.", Journal of Applied Polymer Science, vol. 80, 566-572 (2001), John Wiley & Sons, Inc.

*Primary Examiner* — Michael C Miggins
(74) *Attorney, Agent, or Firm* — William J. Uhl

(57) ABSTRACT

A coating composition for application to the surface of a container comprising:
(a) a film-forming resinous material comprising a functional group-containing reaction product of:
  (i) a cyclic carbonate group-containing material,
  (ii) a polyamine;
(b) a curing agent reactive with functional groups of (a);
(c) a liquid diluent.

47 Claims, No Drawings

CONTAINER COATING COMPOSITIONS

FIELD OF THE INVENTION

The present invention relates to container coating compositions, and more particularly to container coating compositions comprising a film-forming resinous material comprising the reaction product of a polymeric material containing cyclic carbonate groups and a polyamine.

BACKGROUND OF THE INVENTION

Coating compositions based on polymeric resinous binders are used to coat the surfaces of containers such as food and beverage cans. The resinous binders may be spray applied to the interior surface of the can or applied to a continuous metal strip using a coil coating process and the coated strip formed into a can body or a can end. Consequently, the polymeric resinous binder must possess a variety of properties. It should be safe for food contact; have good adhesion to the substrate; resist degradation and be flexible to tolerate the various fabrication steps. Polymeric binders based on epoxy resins made from bisphenol A have for many years been the polymeric binder of choice because the resultant coating has good overall properties for container applications. Unfortunately, these compounds are perceived as being potentially harmful to human health. Consequently, there is public sentiment to eliminate these polymers from container coatings.

Polyurethanes made from the reaction of polyisocyanates with polyols have been proposed as replacements for bisphenol A-containing polymers. However, polyisocyanates can cause respiratory problems and are difficult to work with. Also, end users of coating compositions made from such polyurethanes are reluctant to use such compositions with food-contacting coatings because of the danger of isocyanates being extracted from the coating. Consequently, it would be desirable to have coating compositions based on a polymer binder that has the good overall properties of polyurethanes but does not have the problems associated with the use of polyisocyanates.

SUMMARY OF THE INVENTION

The present invention provides a coating composition for application to the surface of a container comprising:
 (a) a film-forming resinous material comprising a functional group-containing reaction product of:
  (i) a cyclic carbonate group-containing material,
  (ii) a polyamine;
 (b) optionally a curing agent reactive with the functional groups of (a);
 (c) a liquid diluent.

The invention also provides a container having applied to its interior surface the coating composition described above.

The invention also provides a method comprising;
 (a) providing a coating composition described above,
 (b) applying the coating composition to a metal substrate prior to or after forming the metal substrate into a food or beverage can or a can end.

The invention also provides an aqueous polyurethane dispersion prepared by:
 (a) mixing together the following ingredients to form a dispersion in aqueous medium:
  (i) optionally a polymer containing polymerizable ethylenically unsaturated groups,
  (ii) a monomer component containing a mixture of monomers comprising a polymerizable ethylenically unsaturated monomer containing cyclic carbonate groups,
  (iii) a dispersing agent;
 (b) subjecting the dispersion to polymerization conditions to form a polymer containing cyclic carbonate groups;
 (c) reacting the polymer with a polyamine to form a polyurethane dispersed in aqueous medium.

The invention also provides a container having applied to its interior surface a coating composition comprising the aqueous polyurethane dispersion described above.

DETAILED DESCRIPTION

As used herein, unless otherwise expressly specified, all numbers such as those expressing values, ranges, amounts or percentages may be read as if prefaced by the word "about", even if the term does not expressly appear. Moreover, it should be noted that plural terms and/or phrases encompass their singular equivalents and vice versa. For example, "a" polymer, "a" crosslinker, and any other component refer to one or more of these components.

When referring to any numerical range of values, such ranges are understood to include each and every number and/or fraction between the stated range minimum and maximum.

As used herein, the term "polymer" refers broadly to oligomers and both homopolymers and copolymers. The term "resin" is used interchangeably with "polymer".

The terms "acrylic" and "acrylate" are used interchangeably (unless to do so would after the intended meaning) and include acrylic acids, anhydrides, and derivatives thereof, such as their $C_1$-$C_5$ alkyl esters, lower alkyl-substituted acrylic acids, e.g., $C_1$-$C_2$ substituted acrylic acids, such as methacrylic acid, ethacrylic acid, etc., and their $C_1$-$C_4$ alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer. The term "(meth)acrylic polymer" refers to polymers prepared from one or more (meth)acrylic monomers.

The term "acid" includes acid salts.

The term "polycarboxylic acid" includes anhydrides of such acids where they exist and lower alkyl ($C_1$-$C_4$) carbon atom esters of such acids.

As used herein molecular weights are determined by gel permeation chromatography using a polystyrene standard. Unless otherwise indicated molecular weights are on a weight average basis.

The cyclic carbonate group-containing material can be represented by the following structural formula:

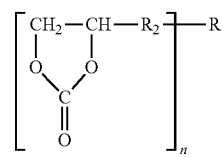

in which $R_2$ is an alkylene chain of 1 to 4 carbon atoms, R is an organic radical, typically derived from a polyol. R can be a radical derived from a polyglycidyl ether, or a polymeric material such as an acrylic polymer, a polyester polymer, a polyether polymer and a polyurethane polymer including mixtures thereof; n stands for an integer of at least 2, such as 1 to 5 and 2 to 3.

The polyglycidyl ether is typically obtained by reacting epichlorohydrin with a polyalcohol. Examples of polyalcohols include bis(4-hydroxycyclohexyl)2,2-propane, bis(2-hydroxynaphthyl)methane, 1,5-dihydroxynaphthalene, cyclohexane dimethanol and glycerol.

Also, the polyalcohol may be a polyether alcohol of the structure:

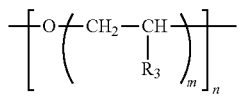

where $R_3$ is hydrogen or alkyl, preferably lower alkyl (e.g., having 1 to 6 carbon atoms) and m is 1 to 4 and n is 2 to 50.

The polyglycidyl ether is then reacted with carbon dioxide to convert the 1,2-epoxy group to the cyclic carbonate group. Reaction can be done at pressures from atmospheric to 150 psi. The temperature for reaction is typically 60150° C. Catalysts such as tertiary amines may be used.

The acrylic polymer can be prepared by polymerizing under free radical polymerization conditions a monomer mixture comprising a monomer (I) of the structure:

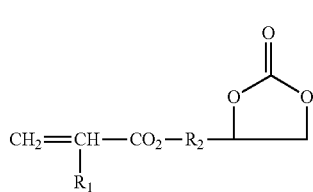

wherein $R_1$ is hydrogen or a methyl group and $R_2$ is an alkylene chain of from 1 to 4 carbons, and (2) one or more polymerizable ethylenically unsaturated monomers that are unreactive with the cyclic carbonate functional groups of monomer (I).

Monomer (I) is typically present in the monomer mixture in an amount of from 1 to 50 percent by weight, based on the total weight of the monomer mixture, usually from 5 to 35, such as from 15 to 25, based on the total weight of monomer mixture.

Monomer (I) can be prepared by the reaction of a 1,2-epoxy-group containing monomer with carbon dioxide under the conditions described above to convert the 1,2-epoxy group to a cyclic carbonate group. Examples of suitable 1,2-epoxy group-containing monomers include, without limitation, glycidyl (meth)acrylate, glycidyl crotonate, and allyl glycidyl ether.

The monomer mixture may comprise one or more additional ethylenically unsaturated monomers which are different from monomer (I).

Illustrative examples of such monomers include functional monomers such as hydroxyl functional ethylenically unsaturated monomers and carboxylic acid functional ethylenically unsaturated monomers.

Illustrative hydroxyl functional ethylenically unsaturated monomers are hydroxyalkyl esters of (meth)acrylic acid such as hydroxyethyl(meth)acrylate, hydroxypropyl(meth)acrylate and mixtures thereof.

Illustrative carboxylic acid functional ethylenically unsaturated monomers are (meth)acrylic acid, maleic acid and crotonic acid.

The monomer mixture may further optionally comprise one or more nonfunctional ethylenically unsaturated monomers. Illustrative nonfunctional monomers include vinyl monomers such as styrene, alpha-methyl styrene, vinyl toluene, tert-butyl styrene, and 2-vinyl pyrrolidone and alkyl esters of (meth)acrylic acid. Illustrative examples of alkyl esters of (meth)acrylic acid include ethyl (meth)acrylate, butyl (meth)acrylate, 2-ethylhexyl (meth)acrylate, cyclohexyl (meth)acrylate, lauryl (meth)acrylate, isodecyl (meth)acrylate, and methyl (meth)acrylate.

The different ethylenically unsaturated monomers are typically present in the monomer mixture in an amount of from 50 to 99 percent by weight, based on the total weight of the monomer mixture, usually from 65 to 95, such as from 75 to 85, based on the total weight of the monomer mixture.

The acrylic polymer will typically be hydroxyl-containing having an OH value of 0 to 40 and having a molecular weight of 10,000 to 50,000.

Examples of polyesters containing cyclic carbonate groups are those that are obtained by reacting a carboxylic acid functional polyester with a 1,2-carbonate alcohol such as the 1,2-carbonate of an alpha, beta, gamma-alkanetriol represented by the formula:

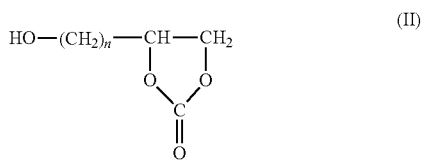

where n is a value of 1 to 4. Examples of such carbonates are 1,2 carbonates of 1,2,3-propanetriol; 1,2,4-butanetriol and 1,2,5-pentanetriol.

The carboxylic acid functional polyesters are prepared by reacting a polybasic acid having at least two carboxylic acid groups per molecule and polyhydric alcohols having at least two hydroxyl groups per molecule.

Examples of the polycarboxylic acids include phthalic acid, isophthalic acid, terephthalic acid, succinic acid, adipic acid, azelaic acid, sebacic acid, maleic acid, fumaric acid, itaconic acid, trimellitic acid and pyromellitic acid.

Examples of polyhydric alcohols include those compounds containing at least two hydroxyl groups per molecule, which are customarily used as alcohol component for polyester production. As examples of such alcohols, glycols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanedial, 2,4-pentanediol, 2,3-dimethyltrimethylene glycol, tetramethylene glycol, 3-methyl-4,5-pentanediol, 2,2,4-trimethyl-1,3-pentanediol, 1,6-hexanediol, 1,5-hexanediol, 1,4-hexanediol, 2,5-hexanediol, neopentyl glycol, hydroxypivalic acid neopentyl glycol ester and the like; polylactonediols formed by adding lactones such as epsilon-caprolactone to these glycols; polyester diols such as bis(hydroxyethyl)terephthalate; and polyhydric alcohols having at least 3 hydroxyl groups per molecule, such as glycerine, trimethylolpropane, trimethylolethane, diglycerine, triglycerine, 1,2,6-hexanetriol, pentaerythritol, dipentaerythritol, tripentaerythritol, sorbitol and mannitol.

The hydroxyl functional carbonate (II) is reacted with a carboxylic acid functional polyester under conventional esterification conditions. The equivalent ratio of (II) to carboxyl functional polyester is from 0.5 to 1:1.

The resulting polyester is typically hydroxyl-containing having a hydroxyl value of 150 to 160 and a molecular weight of 2000 to 4000.

Similarly, carboxylic acid functional acrylic polymer, polyurethane polymer and polyether polymer can be reacted with the above-mentioned 1,2-carbonate alcohols (II).

The polyamines that are reacted with the cyclic carbonates are typically those of the structure:

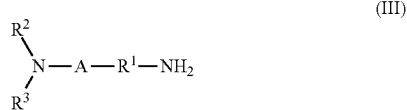

in which
$R^1$ denotes a divalent hydrocarbon radical, such as a straight-chain or branched alkylene radical of 2 to 18, preferably 2 to 4, carbon atoms,
$R^2$ denotes hydrogen, alkyl of 1 to 8 carbon atoms, such as 1 to 4 carbon atoms, or hydroxyalkyl of 1 to 8 carbon atoms, usually 1 or 2 carbon atoms in the alkyl radical,
$R^3$ is equal to $R^2$, as long as $R^2$ and $R^3$ can also produce a cyclic ring compound, preferably 5-, 6- or 7-membered aliphatic ring,
A is a divalent linking group or a chemical bond.

When A is a chemical bond, the polyamines are of the structure:

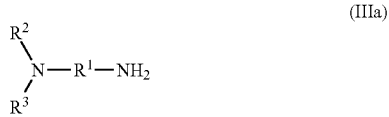

where $R^1$ to $R^3$ have the above-mentioned definitions. Examples of such polyamines are: N-methylethylenediamine, hydroxyethylaminoethylamine, hydroxyethylaminopropylamine, N,N'-dimethylethylenediamine, N,N'-dimethylpropylenediamine, N,N'-dihydroxyethylethylenediamine; ethylenediamine, propylenediamine, hexamethylenediamine, octamethylenediamine, triacetonediamine, dioxadecanediamine, dioxadodecanediamine and higher homologs; cycloaliphatic diamines such as 1,4-cyclohexanediamine, 4,4'-methylenebiscyclohexylamine and 4,4'-isopropylenebiscyclohexylamine, isophoronediamine and N-aminoethylpiperazine. It is of course also possible to use mixtures of these polyamines with one another, including for example mixtures of diprimary with monoprimary polyamines as well as with those of the formula (IIIb) below.

In the above formula (III), A can also stand for —$(R^1NH)_r$—$R^1$—NH— resulting in a polyamine of the formula:

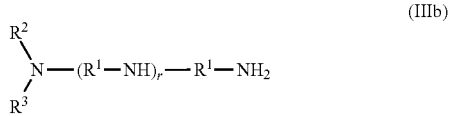

in which $R^1$ to $R^3$ have the above meaning and r stands for 1 to 6, preferably 1 to 4.

Examples of such polyamines are: diethylenetriamine, dipropylenetriamine, bishexamethylenetriamine, triethylenetetramine, tetraethylenepentamine, pentaethylenehexamine, heptaethyleneoctamine and the like.

Mixtures of polyamines and monoamines such as dimethyl amine and dimethyl ethanolamine may also be used.

The polymer with the cyclic carbonate groups and the polyamine are used in equivalent ratios of amine to cyclic carbonate of 0.4 to 1.2:1, such as 0.6 to 1.0:1.

The reaction may be carried out either solvent-free or in a suitable organic solvent or solvent mixture. Examples include toluene, xylene, butyl acetate, ethyl acetate, ethyl glycol acetate, pentyl acetate, hexyl acetate, methoxypropyl acetate, tetrahydrofuran, dioxan, dibutyldiglycol, acetone, methyl ethyl ketone, methyl isobutyl ketone, cyclopentanone, cyclohexanone, N-methyl-pyrrolidone, dimethyl formamide, higher-substituted aromatics (such as solvent naphtha, heavy benzole, the Solvesso solvents and Diasol solvent) and higher-boiling aliphatic and cycloaliphatic hydrocarbons (such as white spirits, mineral oil of turpentine, Ispar solvents, Nappar solvents, tetralin and decalin).

The reaction is generally conducted at a temperature of 20° to 130° C., preferably 40° to 100° C.

In order to accelerate the reaction between the polymer containing cyclic carbonate groups and the polyamine, catalysts may optionally be used. Examples include tertiary amines such as triethylamine, tributylamine, 1,4-diazabicyclo-(2,2,2)-octane and N,N-dimethyl benzylamine.

The reaction product of the polymer containing the cyclic carbonate group and the polyamine is typically present in the coating composition in amounts of 50 to 99 percent, such as 60 to 90 percent by weight based on weight of resin solids in the coating composition.

The coating compositions further comprise a curing agent that is reactive with itself and with the functional groups such as amine, hydroxyl and/or carboxylic acid groups of the cyclic carbonate-polyamine reaction product to form a thermally crosslinked coating. Suitable crosslinking agents are aminoplast, phenolic and styrene maleic anhydride copolymers. Aminoplast crosslinkers can be melamine based, urea based, glycoluril, or benzoguanamine based. Melamine crosslinkers are widely commercially available, such as from Cytec Industries, Inc., in their CYMEL line. Phenolic crosslinkers include, for example, novolacs and resoles. For use on food cans, phenolic resoles that are not derived from bisphenol A are particularly suitable. Phenol, cresol and xylenol based resoles are particularly suitable. The crosslinking agent is typically present in amounts of 1 to 50, such as 10 to 40 percent by weight based on weight of resin solids in the coating composition.

The coating composition contains a diluent, such as water, or an organic solvent or a mixture or water and organic solvent to dissolve or disperse the ingredients of the composition. The organic solvent is selected to have sufficient volatility to evaporate essentially entirely from the coating composition during the curing process such as during heating from 175-205° C. for about to 15 minutes. Examples of suitable organic solvents are aliphatic hydrocarbons such as mineral spirits and high flash point VM&P naphtha; aromatic hydrocarbons such as benzene, toluene, xylene and solvent naphtha 100, 150, 200 and the like; alcohols, for example, ethanol, n-propanol, isopropanol, n-butanol and the like; ketones such as acetone, cyclohexanone, methylisobutyl ketone and the like; esters such as ethyl acetate, butyl acetate, and the like; glycols such as butyl glycol, glycol ethers such as methoxypropanol and ethylene glycol monomethyl ether and ethylene glycol monobutyl ether and the like. Mixtures of various organic solvents can also be used. The diluent is used in the coating compositions in amounts of about 20 to 80, such as 30 to 70 percent by weight based on total weight of the coating composition.

Adjuvant resins such as acrylic polyols, polyether polyols and polyester polyols may be included in the coating compositions to maximize certain properties of the resultant coating. When present, the adjuvant resin is used in amounts of up to 50, typically 2-50 percent by weight based on weight of resin solids of the coating composition.

Another optional ingredient that is typically present in the coating composition is a catalyst to increase the rate of cure or crosslinking of the coating compositions. Generally acid catalyst may be used and is typically present in amounts of about 0.05 to 5 percent by weight. Examples of suitable catalysts are dodecyl benzene sulfonic acid, methane sulfonic acid, paratoluene sulfonic acid, dinonyl naphthalene disulfonic acid and phenyl phosphonic acid.

Another useful optional ingredient is a lubricant, for example, a wax which facilitates manufacture of metal closures by imparting lubricity to the sheets of the coated metal substrate. Preferred lubricants include, for example, carnauba wax and polyethylene-type lubricants. If used, the lubricant is preferably present in the coating compositions of at least 0.1 percent by weight based on weight of resin solids in the coating composition.

Another useful optional ingredient is a pigment such as titanium dioxide. If used, the pigment is present in the coating compositions in amounts no greater than 70 percent by weight, preferably no greater than 40 percent by weight based on total weight of solids in the coating composition.

Surfactants can optionally be added to the coating composition to aid in flow and wetting of the substrate. Examples of suitable surfactants include, but are not limited to, nonyl phenol polyether and salts. If used, the surfactant is present in amounts of at least 0.01 percent and no greater than 10 percent based on weight of resin solids in the coating composition.

In certain embodiments, the compositions used in the practice of the invention are substantially free, may be essentially free and may be completely free of bisphenol A and derivatives or residues thereof, including bisphenol A ("BPA") and bisphenol A diglycidyl ether ("BADGE"). Such compositions are sometimes referred to as "BPA non intent" because BPA, including derivatives or residues thereof, are not intentionally added but may be present in trace amounts because of unavoidable contamination from the environment. The compositions can also be substantially free and may be essentially free and may be completely free of bisphenol F and derivatives or residues thereof, including bisphenol F and bisphenol F diglycidyl ether ("BPFG"). The term "substantially free" as used in this context means the compositions contain less than 1000 parts per million (ppm), "essentially free" means less than 100 ppm and "completely free" means less than 20 parts per billion (ppb) of any of the above-mentioned compounds, derivatives or residues thereof.

As mentioned above, the coating compositions of the present invention can be applied to containers of all sorts and are particularly well adapted for use on the interior surface of food and beverage cans (e.g., two-piece cans, three-piece cans, etc.).

The compositions can be applied to the food or beverage container by any means known in the art such as roll coating and spraying. It will be appreciated that for two-piece food cans, the coating will typically be sprayed after the can is made. For three-piece food cans, a flat sheet will typically be roll coated with one or more of the present compositions first and then the can will be formed. As noted above, the percent solids of the composition can be adjusted based upon the means of application. The coating can be applied to a dry film weight of 36 mgs/4 in$^2$ to 4 rags/4 in$^2$, such as 20 mgs/4 in$^2$ to 14 mgs/4 in$^2$.

After application, the coating is then cured. Cure is effected by methods standard in the art. For coil coating, this is typically a short dwell time (i.e., 9 seconds to 2 minutes) at high heat (i.e., 485° F. (252° C.) peak metal temperature); coated metal sheets typically cure longer (i.e., 10 minutes) but at lower temperatures (i.e., 400° F. (204° C.) peak metal temperature). For spray applied coatings on two-piece cans, the cure can be from 5 to 8 minutes, with a 90-second bake at a peak metal temperature of 415° F., (213° C.) to 425° F. (218° C.), or 60-second bake at 390° F. (199° C.).

Any material used for the formation of food cans can be treated according to the present methods. Particularly suitable substrates include tin-plated steel, tin-free steel and black-plated steel.

In a specific embodiment, the coating compositions of the invention can be prepared as an aqueous dispersion. The dispersion is formed by;
  (a) mixing together the following ingredients to form a dispersion in aqueous medium:
    (i) optionally a polymer containing polymerizable ethylenically unsaturated groups,
    (ii) a monomer component containing a mixture of monomers comprising a polymerizable ethylenically unsaturated monomer containing cyclic carbonate groups,
    (iii) a dispersing agent;
  (b) subjecting the dispersion to polymerization conditions to form a polymer containing cyclic carbonate groups;
  (c) reacting the polymer with a polyamine to form a polyurethane dispersed in aqueous medium.

Examples of polymers containing polymerizable ethylenically unsaturated groups (i) are polyester polymers prepared from reacting ethylenically unsaturated polycarboxylic acids with polyhydric alcohols. Examples of such polyesters are those described above using polycarboxylic acids such as maleic acid, fumaric acid and itaconic acid. Typically, the unsaturated polycarboxylic acids will constitute from 3 to 15 percent by weight based on total weight of the reactants used in preparing the polyester polymer.

The monomer component (ii) comprises a mixture of ethylenically unsaturated monomers a portion of which comprise an ethylenically unsaturated monomer containing cyclic carbonate groups. Examples of such monomers are the reaction products of epoxy group-containing ethylenically unsaturated monomers, such as glycidyl (meth)acrylate, glycidyl crotonate and allyl glycidyl ether, that have been reacted with carbon dioxide as generally described above. An example of such monomer is glycidyl (meth) acrylate carbonate. The cyclic carbonate group-containing monomer is typically present in amounts of 1 to 50, such as 5 to 25 percent by weight based on total weight of the ethylenically unsaturated monomers.

Examples of other copolymerizable ethylenically unsaturated monomers are hydroxyl functional and carboxylic acid functional ethylenically unsaturated monomers and vinyl monomers and alkyl esters of (meth)acrylic acid, all as described above.

Components (i) and (ii) are dispersed in aqueous medium typically with the aid of a dispersing agent. The dispersing agent can be a carboxylic acid functional polymer such as a (meth)acrylic acid polymer.

The (meth)acrylic polymer can be prepared by free radical initiated polymerization of polymerizable ethylenically unsaturated monomers including a carboxylic acid group-containing ethylenically unsaturated monomer.

Examples of polymerizable ethylenically unsaturated carboxylic acid monomers are acrylic and methacrylic acid. These monomers are usually present in amounts of about 10 to 60, such as 15 to 50 percent by weight based on total monomer weight used in preparing the (meth)acrylic polymer dispersion and are at least partially neutralized with a base, such as a tertiary amine, to form the amine salt to assist in dispersing the polymer particles.

Examples of other polymerizable ethylenically unsaturated monomers are vinyl aromatic monomers and alkyl esters of (meth)acrylic acid, all as described above. These monomers are typically present in amounts of 40 to 90 percent, such as 50 to 85 percent by weight based on total monomer weight.

The (meth)acrylic polymer dispersant typically has a molecular weight of from 10,000 to 20,000.

The ingredients (i), (ii) and (iii) are typically present in amounts of:
   (i) 0 to 60, such as 25 to 50 percent by weight,
   (ii) 5 to 40, such as 10 to 30 percent by weight, and
   (iii) 5 to 40, such as 10 to 30 percent by weight;
the percentages by weight being based on total weight of (i), (ii) and (iii).

The above ingredients (i), (ii) and (iii) are mixed together in aqueous medium to form a dispersion. The ingredients are then subjected to free radical initiated polymerization conditions to form a polymer containing cyclic carbonate groups. Specifically, the dispersing agent typically with water and organic solvent can be added to a reaction vessel followed by sequential addition of the monomer component and free radical initiators.

Suitable free-radical polymerization initiators are all those capable of triggering a free-radical polymerization in aqueous medium. They may include both peroxides, e.g., alkali metal peroxodisulfates, and azo compounds. As polymerization initiators it is common to use what are known as redox initiators, which are composed of at least one organic reducing agent and at least one peroxide and/or hydroperoxide, e.g., tert-butyl hydroperoxide with sulfur compounds, e.g., the sodium salt of hydroxymethanesulfinic acid, sodium sulfite, sodium disulfite, sodium thiosulfate or acetone bisulfite adduct, or hydrogen peroxide with ascorbic acid. The amount of free-radical initiator systems used, based on the weight of (i) and (ii), is preferably from 0.1 to 2 percent by weight.

Surface-active substances suitable for conducting the emulsion polymerization are the emulsifiers and protective colloids that are normally employed for these purposes. The surface-active substances are usually used in amounts of up to 10 percent by weight, preferably from 0.5 to 5 percent by weight and, in particular, from 1.0 to 4 percent by weight, based on the weight of (i) and (ii).

Examples of suitable protective colloids are polyvinyl alcohols, starch derivatives and cellulose derivatives, and vinylpyrrolidone copolymers.

As surface-active substances, emulsifiers, whose relative molecular weights, unlike those of the protective colloids, are usually below 2000 can be used. They can be either anionic or nonionic in nature. The anionic emulsifiers include alkali metal salts and ammonium salts of alkyl sulfates having 8 to 12 carbon atoms in the alkyl group. Examples of suitable nonionic emulsifiers are ethoxylated mono-, di- and trialkylphenols (a) units: 3 to 50, alkyl: $C_4$-$C_9$).

After polymerization is complete, the polyamine, such as those described above, is added to the dispersion and reacted with a polymer containing cyclic carbonate groups as generally described above. The resulting polyurethane dispersed in aqueous medium is in the form of a gelled microparticle (microgel) having a weight average particle diameter in the range of 100 to 5000 nanometers (nm) as determined by dynamic light scattering techniques. Microgels are polymeric particles that are crosslinked and not soluble in organic solvents but may be swellable in organic solvents. The molecular weights if measurable are high, often at least $10^5$, such as $10^6$ or higher.

EXAMPLES

The following examples are offered to aid in understanding of the present invention and are not to be construed as limiting the scope thereof. Unless otherwise indicated, all parts and percentages are by weight.

Test Methods

The following test methods were utilized in the Examples that follow.
   A. Blush Resistance: Blush resistance measures the ability of a coating to resist attack by various testing solutions. When the coated film absorbs test solution, it generally becomes cloudy or looks white. Blush is measured visually using a scale of 1-10 where a rating of "10" indicates no blush and a rating of "0" indicates complete whitening of the film. Blush ratings of at least 7 are typically desired for commercially viable coatings. The coated panel tested is 2×4 inches (5×10 cm) and the testing solution covers half of the panel being tested so you can compare blush of the exposed panel to the unexposed portion.
   B. Adhesion: Adhesion testing is performed to assess whether the coating adheres to the substrate. The adhesion test is performed according to ASTM D 3359 Test Method B, using Scotch 610 tape, available from 3M Company of Saint Paul, Minn. Adhesion is generally rated on a scale of 1-10 where a rating of "10" indicates no adhesion failure, a rating of "9" indicates 90% of the coating remains adhered, a rating of "8" indicates 80% of the coating remains adhered, and so on.
   C. Dowfax Detergent Test: The "Dowfax" test is designed to measure the resistance of a coating to a boiling detergent solution. The solution is prepared by mixing 5 grams of DOWFAX 2A1 (product of Dow Chemical) into 3000 grams of deionized water. Coated strips are immersed into the boiling Dowfax solution for 15 minutes. The strips are then rinsed and cooled in deionized water, dried, and immediately rated for blush as described previously.
   D. Joy Detergent Test: The "Joy" test is designed to measure the resistance of a coating to a hot 180° F. (82° C.) Joy detergent solution. The solution is prepared by mixing 30 grams of Ultra Joy Dishwashing Liquid (product of Procter & Gamble) into 3000 grams of deionized water. Coated strips are immersed into the 180° F. (82° C.) Joy solution for 15 minutes. The strips are then rinsed and cooled in deionized water, dried, and immediately rated for blush as described previously.
   E. Acetic Acid Test: The "Acetic Acid" test is designed to measure the resistance of a coating to a boiling 3% acetic acid solution. The solution is prepared by mixing 90 grams of Glacial Acetic Acid (product of Fisher Scientific) into 3000 grams of deionized water. Coated strips are immersed into the boiling Acetic Acid solution for 30 minutes. The strips are then rinsed and cooled in deionized water, dried, and immediately rated for blush as described previously.

F. Deionized Water Retort Test: The "DI Water Retort" test is designed to measure the resistance of a coating to deionized water. Coated strips are immersed into the deionized water and placed in a steam retort for 30 minutes at 250° F. (121° C.). The strips are then cooled in deionized water, dried, and immediately rated for blush as described previously.

Example A

Polyester

A polyester containing polymerizable ethylenically unsaturated groups was prepared from the following ingredients as described below:

| Ingredients | Parts by Weight (grams) |
| --- | --- |
| 2-Methyl-1,3-propanediol | 275 |
| Itaconic acid | 69.5 |
| Empol 1008, C36 dimer acid | 680 |

A total of 275 grams of 2-methyl-1,3-propanediol, 69.5 grams of itaconic acid, and 680 grams of Empol 1008 C36 dimer acid were added to a suitable reaction vessel equipped with a stirrer, temperature probe, a steam heated reflux condenser with a distillation head. The reactor was equipped with an inlet used to flush the reactor with a flow of nitrogen. The contents of the flask were heated to 130° C. and the nitrogen cap was switched to a nitrogen sparge. Heating was continued to 180° C. at which time water began to evolve from the reaction. The temperature of the reaction mixture was raised to 200° C. in stages and held at that temperature until 96 grams of water had been distilled and the acid value of the reaction mixture measured 1.99. The contents of the reactor were cooled and poured out. The final material was a viscous liquid material with a measured solids of 94.9%, a measured bubble viscosity of Z4+, a hydroxyl value of 152.1, and a weight average molecular weight of 3117 as measured against a polystyrene standard.

Example B

Dispersing Agent

A (meth)acrylic polymer for use as a dispersing agent was prepared from the following ingredients as described below:

| Ingredients | Parts by Weight (grams) |
| --- | --- |
| Butyl Cellosolve | 394.9 |
| Propylene glycol methyl ether (Dowanol PM) | 227.7 |
| Luperox 270 | 22.5 |
| Butyl acrylate | 198 |
| Methyl methacrylate | 141 |
| Hydroxyethyl methacrylate | 57 |
| Methacrylic acid | 204 |

A total of 126 grams of 2-butoxy ethanol (butyl Cellosolve) and 84 grams of Dowanol PM were added to a suitable reaction vessel equipped with a stirrer, temperature probe and a reflux condenser. The reactor was equipped with an inlet used to flush the reactor with a flow of nitrogen. The mixture was heated to reflux at 140° C. A mixture of 18 grams of Luperox 270 and 63.8 grams of butyl Cellosolve was added to the reactor dropwise via an addition funnel over 3 hours. Concomitantly, but with a 5-minute delay, a mixture of 198 grams of butyl acrylate, 141 grams of methyl methacrylate, 57 grams of hydroxyethyl methacrylate, and 204 grams of methacrylic acid was added to the reactor dropwise via an addition funnel over 2.5 hours. When the monomer mixture was finished, the addition funnel was rinsed with 30 grams of butyl Cellosolve, which was then added to the reaction. After the initiator feed was finished, a mixture of 4.5 grams of Luperox 270 and 10.5 grams of butyl Cellosolve was added to the reactor dropwise via an addition funnel over 30 minutes. The addition funnel was then rinsed with 1.5 grams of butyl Cellosolve, which was added to the reaction mixture. The reaction was maintained at 140° C. and held for 1 hour. A mixture of 163.1 grams of butyl Cellosolve and 143.7 grams of Dowanol PM was added to the reaction mixture. The contents of the reactor were cooled to 80° C. and poured out. The final material was a clear viscous liquid with a theoretical acid value of 106.9, and theoretical hydroxyl number of 19.8, measured solids (on solution basis) of 51.2%, and a weight average molecular weight of 13,949 as measured against a polystyrene standard.

Example C

Aqueous Polyurethane Dispersion

An aqueous polyurethane resin dispersion was prepared from the following ingredients as described below:

| Ingredients | Parts by Weight (grams) |
| --- | --- |
| Deionized water | 184.59 |
| Dispersing Agent of Example B | 39.1 |
| Dimethylethanol amine | 5.54 |
| Polyester of Example A | 35.4 |
| Glycidyl methacrylate carbonate | 7.5 |
| Butyl methacrylate | 40.8 |
| Styrene | 2.1 |
| Isoascorbic acid | 0.30 |
| 2% Ferrous ammonium sulfate solution | 0.15 |
| 70% tert-Butylhydroperoxide | 0.43 |
| Isophorone diamine | 4.3 |

A total of 58.4 grams of water, 39.1 grams of the dispersing agent of Example B, and 2.48 grams of dimethylethanol amine were added to a suitable reaction vessel equipped with a stirrer, temperature probe and a reflux condenser. The reactor was equipped with an inlet used to sparge the mixture with nitrogen for 20 minutes. The mixture was heated to 50° C. and the sparge was removed to provide a positive flow of nitrogen through the reaction vessel. To the reactor was added 0.3 grams of isoascorbic acid, 0.15 grams of 2% ferrous ammonium sulfate solution, and 6.2 grams of deionized water and the reaction was held for a minimum of 5 minutes. A mixture of 35.4 grams of the polyester of Example A, 7.5 grams of glycidyl methacrylate carbonate, 40.8 grams of butyl methacrylate, and 2.1 grams of styrene was added to the reactor dropwise via an addition funnel over 1 hour and the contents were mixed thoroughly. Concomitantly, a mixture of 0.43 grams of 70% tert-butylhydroperoxide and 60 grams of deionized water was also added to the reaction vessel over 1 hour. The reaction was then held for 1 hour at 50° C. After holding, a mixture of 3.06 grams of dimethylethanol amine and 10 grams of deionized water was added to the reaction mixture and the reaction temperature was increased to 80° C. At 80° C., a mixture of 4.3 grams of isophorone diamine and 50 grams of deionized water was dropwise added over 30 minutes. The reaction was then held at 80° C. for 1 hour, cooled to <40° C. and poured out. The final material was a liquid dispersion with a measured solids of 34.7%.

Examples 1-3

Coating Composition

The aqueous polyurethane dispersion of Example C was coalesced with butyl Cellosolve at 10% on resin solids by weight. It was also formulated with no crosslinker and with 7.5% as well as 15% Cymel 327 solids on total resin solids by weight. The paints were reduced to 30% weight solids with deionized water. The paints were prepared by adding the materials in the order shown in Table 1 into a small lined paint can under modest agitation with a standard paint mixing blade. After all of the ingredients were added, the paints were stirred for an additional 5 minutes.

The coatings were evaluated for the number of double rubs by hand it took to soften and break through the coating with a rag saturated with methyl ethyl ketone. Their flexibility was evaluated with a wedge bend test. For this test, coated panels were cut into 2 inch by 4.5 inch pieces, with the substrate grain running perpendicular to the long length of the cut panel. They were then bent over a ¼ inch metal dowel along the long length of the panel with the coated side facing out. The bent coupons were then placed onto a block of metal where a wedge was pre-cut out of it with a taper of 0 to ¼ inch along a 4.5 inch length. Once placed in the wedge, each bent coupon was struck with a block of metal which weighed 2.1 kilograms from a height of 11 inches to form a wedge where one end of the coated metal impinged upon itself and a ¼ inch space remained on the opposite end. The wedge bent panels were then placed into an aqueous solution of copper sulphate and hydrochloric acid for two minutes to purposely etch the aluminum panel in areas where the coatings failed and cracked. The etched wedge bent panels were then examined through a microscope at 1.0× power to determine how far from the impinged end along the bent radii did the coating crack. Flex results are reported as the percentage of cracked area versus total length of the wedge bent panel. The coatings were also evaluated for their ability to adhere to the aluminum panels and to resist blushing in four aqueous solutions as described above. The results of the test are reported in Table 2.

TABLE 2

| Paint | MEK Double Rubs | Wedge Bend % Spotty Failure | | | | Acetic Acid Test | | Dowfax | | Joy Detergent Test | | Water Retort | |
|---|---|---|---|---|---|---|---|---|---|---|---|---|---|
| | | 1 | 2 | 3 | Avg | Blush | Adhesion | Blush | Adhesion | Blush | Adhesion | Blush | Adhesion |
| Epoxy control | 70 | 9 | 19 | 8 | 12 | 8 | 10 | 9 | 10 | 9 | 10 | 9 | 10 |
| Example 1 | 2 | 33 | 29 | 33 | 32 | 7 | 10 | 7 | 10 | 6 | 10 | 8 | 10 |
| Example 2 | 4 | 33 | 36 | 37 | 35 | 7 | 10 | 8 | 10 | 7 | 10 | 7 | 10 |
| Example 3 | 7 | 40 | 36 | 40 | 39 | 7 | 10 | 9 | 10 | 8 | 10 | 7 | 10 |

TABLE 1

| | % TS | Example 1 (Comparative) Wght | Example 2 Wght | Example 3 Wght |
|---|---|---|---|---|
| Aqueous polyurethane dispersion | 34.7 | 50.4 g | 46.7 g | 42.9 g |
| Deionized Water | | 6.1 | 8.5 | 11.0 |
| Butyl Cellosolve | | 1.8 | 1.6 | 1.5 |
| Cymel 327 | 90.0 | | 1.5 | 2.9 |
| Total | | 58.3 | 58.3 | 58.3 |
| % Crosslinker on resin solids | | 0.0 | 7.5 | 15.0 |

Coated panels were obtained by drawing paints over chrome treated 5182-H481 aluminum panels (5"×13") using a wire wound rod to obtain dry coating weights of ~7.0 mg/square inch (msi). The coated panels were immediately placed into a one-zone, gas-fired, conveyor oven for 10 seconds and baked to a peak metal temperature of 450° F. (232° C.). The baked panels were immediately quenched in water upon exit from the oven. They were then dried and cut into smaller test coupons, and their performance was compared to a bisphenol A (BPA) epoxy control available from PPG industries as G1.

Example D

Polyurethane

Add 100 g (solids=84.2% with propylene glycol methyl ether (Dowanol PM) as solvent) of glycerol dicyclic carbonate (GDCC) into a 1 L flask which has been charged with 146.67 g of Dowahol PM. Heat the batch to 220° F. (104° C.) under the protection of N2. When temperature is reached, start adding 78.27 g of raw xylenediamine over 20-30 minutes. When addition is completed, raise batch temperature to 255° F. (124° C.). Hold the batch at 255° F. (124° C.) for 1-2 hours until the complete consumption of cyclic carbonate groups which may be indicated by the disappearance of the FTIR peak of the mixture around 1797 $cm^{-1}$ and the appearance of the FTIR peak around 1707 $cm^{-1}$. The resultant polymer has a number average molecular weight of 2,595 and weight average molecular weight of 28,914 and a structure:

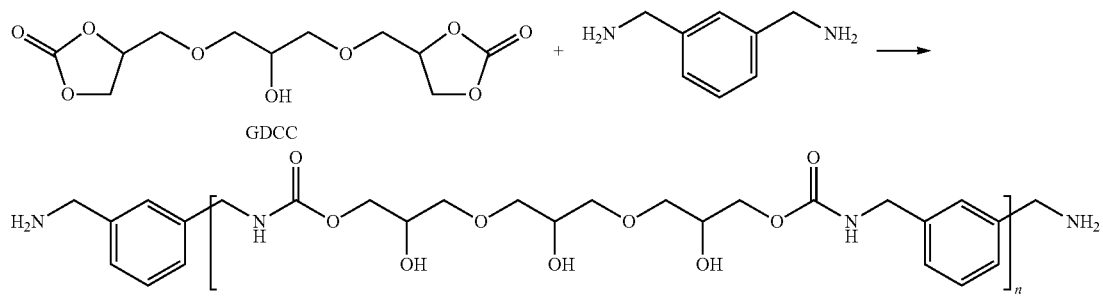

The polyurethane resin was amine functional having an amine equivalent weight of 43.2.

Example E

Polyurethane

Add 100 g (solids=84.2% with Dowanol PM as so/vent) of GDCC into a 1 L flask which has been charged with 146.67 g of Dowanol PM. Heat the batch to 220° F. (104° C.) under the protection of N2. When temperature is reached, start adding 78.27 g of m-xylenediamine over 20-30 minutes. When addition is completed, raise batch temperature to 255° F. (124° C.). Hold the batch at 255° F. (124° C.) for 1-2 hours until the complete consumption of cyclic carbonate groups. Then charge the batch with 71.12 g of propylene carbonate over 20-30 minutes followed by holding at 255° F. (124° C.) for 2 hours. Add 2.2 g of triethylamine and hold for another hour. The resultant polymer has a number average molecular weight of 3,717, weight average molecular weight of 43,302 and an amine equivalent weight of 30.2.

Examples 4-6

Resins made as described in Examples D and E were formulated into coating compositions as shown in Table 3. All coating samples were drawn down onto aluminum metal sheets to form a layer of coating with film weight about 7 msi. The coated panels were then baked at 400° F. (204° C.) for 5 minutes. All samples show excellent solvent and water resistance as indicated by MEK rubs and Joy test. Example 6 exhibited better acid resistance as indicated by the acetic acid boiling test.

TABLE 3

|  | Example D (g) | Example E (g) | SMA 1440 (g)[1] | Butyl Cellosolve (g) |
|---|---|---|---|---|
| Example 4 | 5 |  | 2 | 3.2 |
| Example 5 | 5 |  | 7.55 | 3.0 |
| Example 6 |  | 5 | 1.5 | 3.0 |

[1]Styrene maleic anhydride copolymer from Cray Valley.

TABLE 4

|  | MEK Rubs | Joy Detergent Test | Acetic Acid Test |
|---|---|---|---|
| Example 4 | 100+ | 10 | 1 |
| Example 5 | 100+ | 10 | 1 |
| Example 6 | 100+ | 10 | 10 |

Example F

Polyurethane

Add 100 g of cyclohexane dimethylol dicyclic carbonate (CHDMDCC), solids=46.4% with Dowanol PM as solvent, into a 1 L flask which has been charged with 140.96 g of Dowanol PM. Heat the batch to 220° F. (104° C.) under the protection of N2. When temperature is reached, start adding 30.48 g of m-xylenediamine over 20-30 minutes. When addition is completed, raise batch temperature to 255° F. (124° C.). Hold the batch at 255° F. (124° C.) for 6 hours. Add 1.16 g of triethylamine as catalyst if necessary. Then add 5.39 g of acrylic acid and hold for 1 hour. Add another charge of 6.39 g of acrylic acid and hold for 1 hour. The product is dark yellow viscous liquid having a structure as shown below:

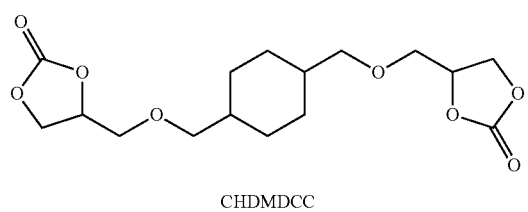 [SMILES: O=C1OCC(COCC2CCC(COCC3COC(=O)O3)CC2)O1]

CHDMDCC

Example G

Polyurethane

Add 100 g of CHDMDCC (solids=46.4% with Dowanol PM as solvent) into a 1 L flask which has been charged with 42.16 g of Dowanol PM. Heat the batch to 255° F. (124° C.) under the protection of N2. When temperature is reached, start adding 27.94 g of m-xylenediamine over 20-30 minutes. When addition is completed, hold the batch at 255° F. (124° C.) for 8 hours. Start cooling to 212° F. (100° C.). Charge the flask with 5.46 g of phthalic anhydride once temperature reaches 212° F. (100° C.). Then hold at 212° F. (100° C.) for 2-3 hours until all anhydride has reacted. Add 48.29 g of Dowanol PM to lower solids to around 45%.

Example 7

A coating composition was formulated using resin from Example G (Table 5). Coating samples were drawn down onto aluminum metal sheets to form a layer of coating with film weight about 7 msi. The coated panels were then baked in a coil oven with dwell time of 9-10 seconds and PMT of 435-450° F. (224-232° C.). Coating film exhibited good blush resistance in Joy Detergent and acetic acid tests, good flexibility in Wedge Bend test and acceptable curing as indicated by MEK double rubs.

TABLE 5

| Example G (g) | Dowanol PM (g) | Cymel 303[1] (g) | Cycat 600 (g) | Adhesion Promoter[2] (g) |
|---|---|---|---|---|
| 5 | 4 | 0.24 | 0.024 | 0.06 |

[1]Aminoplast crosslinking agent from Cytec Industries.
[2]As described in US 2012/0300647A1.

TABLE 6

| Joy Detergent Test | Acetic Acid Test | Wedge Bend Spotty Failure (%) | MEK Rubs |
|---|---|---|---|
| 9 | 9 | 25 | 30 |

Example H

Polyurethane

Add 32.59 g of m-xylenediamine to a 1 L flask and heat up to 230° F. (110° C.) with continuous $N_2$ sparge. Add 30 g of Dowanol PM and raise batch temperature to 255° F. (124° C.) to reflux. Hold the batch at 255° F. (124° C.) for 30 minutes. Add 200 g of polypropylene glycol dicyclic carbonate (PPGDCC), solids=85.6% with Dowanol PM as solvent, M.W.=556, over 20-30 minutes and then hold at 255° F. (124° C.) for 4-5 hours. Add 77.93 g of Dowanol PM.

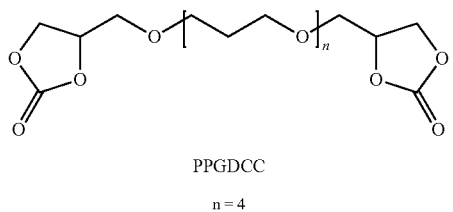

PPGDCC n = 4

The invention claimed is:

1. A coating composition for application to the interior surface of a food or beverage container comprising:
   (a) a film-forming resinous material comprising a functional group-containing reaction product of:
      (i) a cyclic carbonate group-containing material containing at least two cyclic carbonate groups,
      (ii) a polyamine;
   (b) a curing agent reactive with the functional groups of (a);
   (c) a liquid diluent.
2. The coating composition of claim 1 in which (i) is selected from the group consisting of glycerol dicyclic carbonate, cyclohexane dimethylol dicyclic carbonate and polypropylene glycol dicyclic carbonate.
3. The coating composition of claim 1 in which the polyamine contains at least two primary amine groups.
4. The coating composition of claim 1 in which the curing agent is selected from the group consisting of phenolplast, aminoplast and styrene maleic anhydride copolymer.
5. The coating composition of claim 1 in which (a) is present in amounts of 50 to 99 percent by weight and (b) is present in amounts of 1 to 50 percent by weight, the percentages by weight being based on resin solids in the coating composition.
6. The coating composition of claim 1 in which the liquid diluent is organic medium substantially free of water.
7. The coating composition of claim 1 in which the liquid medium is aqueous medium.
8. A method comprising:
   (a) providing a coating composition of claim 1,
   (b) applying the coating composition to a metal substrate prior to or after forming the metal substrate into a food or beverage can or a can end.
9. The coating composition of claim 1 in which (i) is selected from the group consisting of acrylic polymers, polyester polymers, polyurethane polymers and polyether polymers.
10. The coating composition of claim 9 in which the acrylic polymer is prepared with glycidyl methacrylate carbonate.
11. The coating composition of claim 9 in which the polyester polymer is prepared by reacting a carboxylic acid or anhydride group-containing polyester with a hydroxyalkyl carbonate.
12. The coating composition of claim 9 in which the polyether polymer is obtained by reaction of an epoxy group-containing polyether with carbon dioxide.
13. A container having applied to its interior surface a coating composition comprising:
   (a) a film-forming resinous material comprising a functional group-containing reaction product of:
      (i) a cyclic carbonate group-containing material containing at least two cyclic carbonate groups,
      (ii) a polyamine;
   (b) a curing agent reactive with the functional groups of (a);
   (c) a liquid diluent.
14. The container of claim 13 in which (i) is selected from the group consisting of glycerol dicyclic carbonate, cyclohexane dimethylol dicyclic carbonate and polypropylene glycol dicyclic carbonate.
15. The container of claim 13 in which the polyamine contains at least two primary amine groups.
16. The container of claim 13 in which the curing agent is selected from the group consisting of phenolplast, aminoplast and styrene maleic anhydride copolymer.
17. The container of claim 13 in which (a) is present in amounts of 50 to 99 percent by weight and (b) is present in amounts of 1 to 50 percent by weight, the percentages by weight being based on resin solids in the coating composition.
18. The container of claim 13 in which the liquid diluent is organic medium substantially free of water.
19. The container of claim 13 in which the liquid medium is aqueous medium.
20. The container of claim 13 which is a food or beverage can or a food or beverage can end.
21. The container of claim 13 in which (i) is selected from the group consisting of acrylic polymers, polyester polymers, polyurethane polymers and polyether polymers.
22. The container of claim 21 in which the acrylic polymer is prepared with glycidyl methacrylate carbonate.
23. The container of claim 21 in which the polyester polymer is prepared by reacting a carboxylic acid or anhydride group-containing polyester with a hydroxyalkyl carbonate.

24. The container of claim 21 in which the polyether polymer is obtained by reaction of an epoxy group-containing polyether with carbon dioxide.

25. An aqueous polyurethane dispersion prepared by:
(a) mixing together the following ingredients to form a dispersion in aqueous medium:
  (i) a monomer component containing a mixture of ethylenically unsaturated monomers comprising a polymerizable ethylenically unsaturated monomer containing cyclic carbonate groups,
  (ii) a dispersing agent;
(b) subjecting the dispersion to polymerization conditions to form a polymer containing cyclic carbonate groups;
(c) reacting the polymer with a polyamine to form a polyurethane dispersed in aqueous medium.

26. The aqueous polyurethane dispersion of claim 25 in which the monomer component contains a (meth)acrylic monomer different from the ethylenically unsaturated monomer containing cyclic carbonate groups.

27. The aqueous polyurethane dispersion of claim 25 in which the ethylenically unsaturated monomer component which contains cyclic carbonate groups is glycidyl (meth) acrylate carbonate.

28. The aqueous polyurethane dispersion of claim 25 in which the polymerization conditions are redox polymerization conditions.

29. The aqueous polyurethane dispersion of claim 25 in which the polyamine contains two or more primary amine groups.

30. The aqueous polyurethane dispersion of claim 25 in which the polyurethane is in the form of gelled particles.

31. The aqueous polyurethane dispersion of claim 25 in which the dispersing agent is charged to a reaction vessel followed by the sequential addition of the monomer component.

32. The aqueous polyurethane dispersion of claim 25 in which the dispersion in aqueous medium comprises a polymer containing polymerizable ethylenically unsaturated groups.

33. The aqueous polyurethane dispersion of claim 32 in which the polymer containing polymerizable ethylenically unsaturated groups is a polyester.

34. The aqueous polyurethane dispersion of claim 33 in which the polyester is prepared by reacting an ethylenically unsaturated polycarboxylic acid with a polyol.

35. The aqueous polyurethane dispersion of claim 25 in which the dispersing agent is a polymer containing at least partially neutralized carboxylic acid groups.

36. The aqueous polyurethane dispersion of claim 35 in which the polymer is a (meth)acrylic polymer.

37. A container having applied to its interior surface a coating composition comprising an aqueous polyurethane dispersion prepared by:
(a) mixing together the following ingredients to form a dispersion in aqueous medium:
  (i) a polymer containing polymerizable ethylenically unsaturated groups,
  (ii) a monomer component containing a mixture of ethylenically unsaturated monomers comprising a polymerizable ethylenically unsaturated monomer containing cyclic carbonate groups,
  (iii) a dispersing agent;
(b) subjecting the dispersion to polymerization conditions to form a polymer containing cyclic carbonate groups;
(c) reacting the polymer with a polyamine to form a polyurethane dispersed in aqueous medium.

38. The container of claim 37 in which the monomer component contains a (meth)acrylic monomer different from the ethylenically unsaturated monomer containing cyclic carbonate groups.

39. The container of claim 37 in which the ethylenically unsaturated monomer component which contains cyclic carbonate groups is glycidyl (meth)acrylate carbonate.

40. The container of claim 37 in which the polymerization conditions are redox polymerization conditions.

41. The container of claim 37 in which the polyamine contains two or more primary amine groups.

42. The container of claim 37 in which the polyurethane is in the form of gelled particles.

43. The container of claim 37 in which the dispersing agent is charged to a reaction vessel followed by the sequential addition of the monomer component.

44. The container of claim 37 in which the polymer containing polymerizable ethylenically unsaturated groups is a polyester.

45. The container of claim 44 in which the polyester is prepared by reacting an ethylenically unsaturated polycarboxylic acid with a polyol.

46. The container of claim 37 in which the dispersing agent is a polymer containing at least partially neutralized carboxylic acid groups.

47. The container of claim 46 in which the polymer is a (meth)acrylic polymer.

* * * * *